United States Patent

[11] 3,573,751

[72] Inventor William E. DeLisle
Buffalo, N.Y.
[21] Appl. No. 818,218
[22] Filed Apr. 22, 1969
[45] Patented Apr. 6, 1971
[73] Assignee Sylvania Electric Products Inc.

[54] FAULT ISOLATION SYSTEM FOR MODULARIZED ELECTRONIC EQUIPMENT
10 Claims, 4 Drawing Figs.

[52] U.S. Cl. .......... 340/172.5
[51] Int. Cl. .......... G06f 11/02
[50] Field of Search .......... 340/172.5; 235/157, 151.31; 324/73

[56] References Cited

UNITED STATES PATENTS

| | | | |
|---|---|---|---|
| 2,977,535 | 3/1961 | O'Connor et al. | 235/151.31X |
| 3,158,840 | 11/1964 | Baskin | 340/172.5 |
| 3,219,927 | 11/1965 | Topp et al. | 324/73 |
| 3,226,684 | 12/1965 | Cox | 340/172.5 |
| 3,237,100 | 2/1966 | Chalfin et al. | 324/73 |
| 3,343,141 | 9/1967 | Hackl | 340/172.5 |
| 3,405,258 | 8/1968 | Godoy et al. | 340/172.5X |
| 3,440,617 | 4/1969 | Lesti | 340/172.5 |
| 3,446,950 | 5/1969 | King et al. | 340/172.5X |

OTHER REFERENCES

Bradley, Programmer' s Guide to the IBM System 360, 1969, pp. 33—53, 90-99

*Primary Examiner*—Paul J. Henon
*Assistant Examiner*—R. F. Chapuran
*Attorneys*—Norman J. O'Malley, Elmer J. Nealon and Edward J. Coleman

ABSTRACT: A system for isolating faulty circuit modules in electronic equipment by the use of binary signature waveforms. All binary waveforms are partitioned into a selected number of classes by sampling each waveform at a predetermined synchronous rate to provide a series of binary sample values, forming *n*-bit binary numbers from successive *n*-bit groups of sample values, and summing, modulo N, all the *n*-bit binary numbers so formed during a predetermined interval, the remainder of said modulo N summation being used as a class identifier. To isolate circuit failures, each module is energized to generate a signature waveform which is analyzed to determine its class identifier. This analyzed class identifier is then compared with the stored class identifier of the correct signature waveform for that module, and a disagreement therebetween indicates a faulty circuit. Apparatus for isolating faults in this manner comprises a memory for storing the predetermined correct signature waveform class identifiers for each of the circuit modules, an *n*-bit accumulator for forming and summing the *n*-bit binary numbers from the signature sample values, a digital comparator for comparing the *n*-bit outputs of the memory and accumulator, and a test sequencer for selectively connecting a signature waveform from each of the circuit modules to the load input of the accumulator and selectively reading out from the memory a binary number which is the correct class identifier for the module from which a signature waveform is being obtained for analysis.

INVENTOR.
William E. DeLisle
BY Edward V. Coleman
AGENT.

INVENTOR.
William E. DeLisle
BY Edward J Coleman
AGENT.

INVENTOR.
William DeLisle
BY
Edward J Coleman
AGENT.

FAULT ISOLATION SYSTEM FOR MODULARIZED ELECTRONIC EQUIPMENT

BACKGROUND OF THE INVENTION

This invention relates generally to fault isolation systems and, more particularly, to an improved method and apparatus for isolating faulty circuits in an electrical system having a plurality of interconnected circuits.

The basic approach employed in the past for isolating faulty electrical circuits required an engineer or technician to go through a tedious trouble shooting routine with the aid of an oscilloscope probe. In recent years, this manual technique has been replaced in many instances by the use of automatic built-in or external fault isolation test equipment. For example, one approach is to employ a special purpose computer to analyze the various circuit outputs and isolate a faulty module. Other techniques rely on a variety of internally generated test signals together with appropriate output analyzing equipment. Where parallel channels are part of the electrical system to be tested, fault isolation can be provided by comparing the outputs of functional sections of the parallel channels when excited by identical input signals. In some instances, a redundant parallel channel has been specifically provided solely for fault isolation purposes. In the case of integration-type circuit modules having a digital output, the output of a large performance data store has been compared with the module output to check for proper operation of the module circuitry.

Although these previous fault isolation techniques have been found to perform quite satisfactorily, they are either very limited in application, or complex, inefficient and costly.

In order to provide a more generally applicable fault isolation system, the present invention is based on the formation in each circuit section or module of a signature waveform which is 2*d*, of the partially independent variables of the to the input of the accumulator 32. The *n*-bit accumulator 32 is then operative to form and sum, modulo N, *n*-bit binary numbers from successive bit groups of input Theoretically, one obvious manner of using this deterministic signal from each module for purposes of fault isolation is to store a complete signature waveform pattern for each module, and then sequentially compare each of the stored patterns with its corresponding module to detect faults. Each signature waveform, however, would probably require thousands of bits of information, or more, to represent a signature pattern that had properly exercised all functions of the module. Consequently, a significant disadvantage of this approach is the requirement of a huge output storage device. A simplified module output waveform, recognizable for fault isolation purposes, could probably be provided by supplying an appropriate module input pattern. This supposed solution, however, is also disadvantageous as it would require a very complicated special purpose input pattern requiring an extremely large input storage device for generation.

SUMMARY OF THE INVENTION

With an awareness of the aforementioned disadvantages of the prior art, it is an object of the present invention to provide an improved method and means for isolating faults in an electrical system having a plurality of interconnected circuits.

It is another object of the invention to provide an automatic fault isolation system for modularized electronic equipment which is capable of reliably testing a wide variety of circuit arrangements in a simplified and efficient manner which maximizes cost effectiveness.

The above objects are carried out in one aspect of the invention by partitioning of waveforms into a selected number of classes each having an identifier, determining the identifier of a signature waveform for each of the circuits to be tested which waveform represents proper operation of that circuit, and storing the predetermined class identifier for each of the circuits to be tested. To isolate faults, each circuit to be tested is energized to generate a signature waveform, which is subsequently analyzed to determine its corresponding class identifier. The analyzed class identifier is then compared with the stored class identifier for each circuit, and a faulty circuit is indicated by a disagreement between the compared class identifiers. In another aspect of the invention, apparatus is provided for isolating faults in electrical equipment in accordance with the aforementioned method.

BRIEF DESCRIPTION OF THE DRAWINGS

This invention will be more fully described hereinafter in conjunction with the accompanying drawings, in which.

DESCRIPTION OF PREFERRED EMBODIMENT

For a better understanding of the present invention, together with other and further objects, advantages and capabilities thereof, reference is made to the following disclosure and appended claims in connection with the above-described drawings.

The fault isolation system of the present invention is intended for testing each of the interconnected functional circuits making up an electrical system, such as a transmitter, receiver, or computer. The invention is particularly suited to digital systems, but it is also adaptable to some types of analogue or hybrid systems. An especially useful application of the invention is to provide either built-in or external fault isolation for electronic equipment employing modularized packaging concepts; in this instance, the functional unit to be tested is a plug-in circuit module.

The present fault isolation system is based on the formation in each circuit module of a deterministic signal, hereinafter called a signature, which is a function of all of the partially independent variables of that module. A circuit variable is defined as partially independent if it can be in error due to an active circuit failure without affecting any of the other circuit variables. The only other requirement of the signature is that it have at least one logic transition within a test interval.

Figure 1:
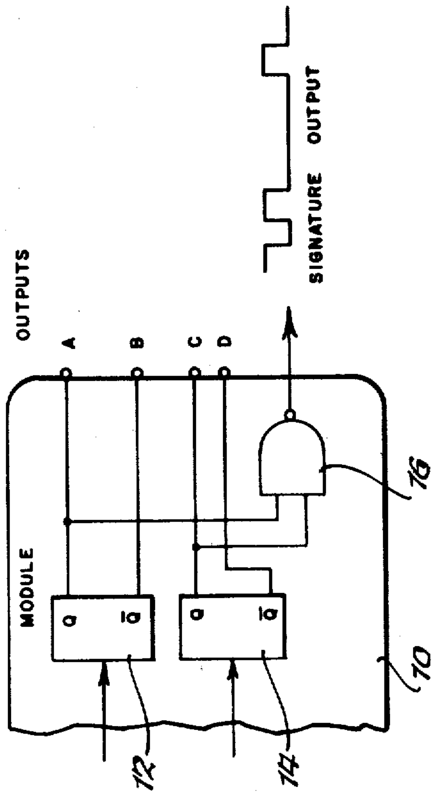
FIG. 1 is a logic diagram of the output portion of a typical circuit module having means for deriving a signature for fault isolation analysis in accordance with the invention.

The logic diagram of FIG. 1 provides a simplified illustration of the aforementioned signature formation technique. The output circuitry of a typical module 10 is shown as comprising a flip-flop 12 having outputs A and B, a flip-flop 14 having outputs C and D and a NAND gate 16 connected to derive a signature for module 10 which is a function of all of the partially independent outputs. In this instance outputs A and C are chosen as the inputs to the NAND gate 16. Outputs B and D are not used for signature formation as they are completely dependent on A and C respectively. As illustrated at the output of NAND gate 16, the signature generated by module 10 is represented by a binary waveform. A useful signature waveform is generated by initially resetting every contributing memory element to a predetermined state, and then supplying a known input signal to the energized module which will adequately exercise its circuitry and preclude ambiguity in signal states. Typically, module 10 would have a variety of logic elements interconnected ahead of flip-flops 12 and 14; however, as the illustration of such circuitry would serve no useful function in the present discussion, it has been omitted for purposes of simplification and clarity.

The appropriate type of input signal and test interval for generating a signature waveform is a matter of design consideration, dependent upon the type of functional circuitry in the module. If the functional circuit operates in a cyclic manner, it is preferable but not necessary to select a test interval exceeding a complete operational cycle of the circuit.

For example, assume that the functional circuit is a *m*-sequence generator comprising a 30-bit shift register with feedback. The operational cycle for this circuit extends for $2^{30}$— bits; however, a test interval starting from a known position and continuing for just 31 bits, during which 31 input pulses are applied to the shift register, is sufficient to exercise the logic elements and show whether or not the elements are functioning properly. Although every combination of logic states has not been examined, every state of every logic element has been occupied so as to enable detecting of catastrophic failures. Extending the test interval to examine all combinations of logic states, to thereby detect second order effects, would be impractical in terms of test equipment cost and complexity, and would not appreciably increase the probability of fault isolation.

On the other hand, in order to adequately exercise a ripple counter, a test interval extending over a complete operational cycle of the counter is required, in view of the reset trigger on the last state. Thus, in order to check all of the transition characteristics of each stage of a 10-stage ripple counter, an input stream of $2^{10}$ pulses is required.

In practice, most of the modules in a digital electronic system would employ a variety of types of circuits. Hence, the most practical and efficient mode of testing such a module is to apply an input signal which simulates normal operation and use a test interval adequate for the functional circuit of the module which requires the longest interval. In the case of a set of digital electronic equipment employing a plurality of interconnected circuit modules, such as a sophisticated radio receiver, the test mode merely requires a single input data stream sufficient to exercise all circuit functions of all modules in normal operation. In this case, a plurality of test intervals may be employed to enable shorter test cycles for modules so permitting. The signature derived from each properly operating module need not be unique; the signature waveforms may be determined according to the most convenient manner of formation, provided they adequately exercise the circuit functions. In testing a plurality of modules, it is merely necessary to correlate the test sequence with the modules in order to identify a module under test at a given moment. In order to avoid ambiguities, however, a predetermined module test sequence must be chosen such that all of the modules providing inputs to a module under test have been tested in earlier intervals.

A particularly unique aspect of the present invention is the method for simplifying analysis of signature signals by partitioning of waveforms into a selected number of classes, each having an identifier, whereby any signature waveform may be characterized by the identifier of the class of partitioned waveforms in which it is included. For the case where the signatures are binary waveforms, as shown in FIG. 1, a particularly suitable method for partitioning the set of all binary waveforms is to sum, modulo N, selected characteristic occurrences of the binary waveforms during a given interval, where N is a predetermined positive integer, and use the remainder of the modulo N addition as the class identifier. In this manner, all binary waveforms are partitioned into N classes.

One approach to this waveform partitioning technique could be to measure the duty cycle of the binary waveforms, modulo N; e.g., by counting, modulo N, all the binary ONES occurring during a predetermined interval. This scheme is somewhat disadvantageous, however, since randomly occurring failures could go undetected with a shift in the pattern.

Another approach could be to measure the average frequency by counting waveform transitions, modulo N. However, this method encounters disadvantages similar to duty cycle measurement, in that the waveform can easily be altered without a change in the average frequency.

Accordingly, a particularly advantageous method of partitioning binary waveforms in accordance with the present invention is to divide the waveform into cells, measure the weight of each cell, and add, modulo N, the weight of all the cells in a test interval to provide a quantitative value representing the class identification number. This approach is especially effective in detecting systematic errors in the logic circuitry being tested, such as a change in phase or frequency, or a logic inversion which might easily be missed by the simpler schemes mentioned above. When using a fault isolation system employing this cell weight summation approach to partitioning, the chances of a failed module going undetected are approximately 1/N, because a failed module will generate any signature class identifier with equal probability.

The method of providing fault isolation in accordance with the invention may be briefly summarized as follows. Having partitioned all binary waveforms into N classes, a class identification number, $R_c$, is determined for the signature waveform of each of the circuit modules to be tested (which waveform represents proper operation of that module under the stimuli applied during the test), and the predetermined number, $R_c$, for each module is stored. Subsequently, the circuit modules are energized to generate signature waveforms, as hereinbefore described, and the signature waveform generated by each module is analyzed to determine the corresponding class identification number, $R_s$. The analyzed class identification number for each module is then compared with the stored class identifier for that module, and a disagreement between $R_c$ and $R_s$ indicates a faulty module.

Figure 2:
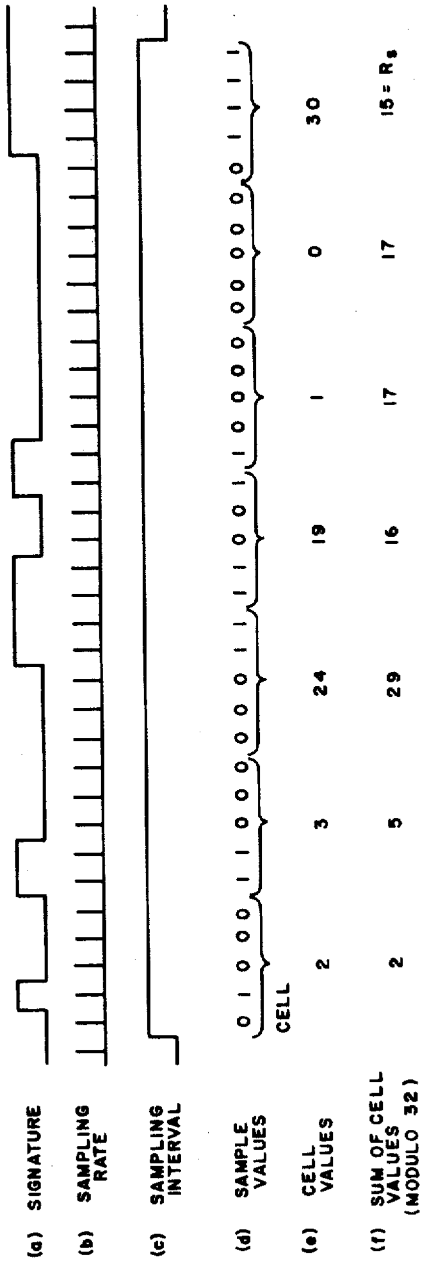
FIGS. 2(*a*)—(*f*) are diagrams of waveforms and binary and decimal values illustrative of the analysis function of the invention.

In accordance with a preferred embodiment of the invention, the analysis procedure which generates $R_s$, which is also the mode for partitioning all binary waveforms into classes, consists of sampling the signature at a predetermined synchronous rate to provide a series of binary sample values, forming *n*-bit binary numbers from successive *n*-bit groups, or cells, of sample values, and adding the values, or weights, of all the cells in a predetermined sample interval, modulo N. An example of this analysis procedure is illustrated by the diagrams in FIG. 2, where N=32, *n*=5 and $R_s$=15. FIG. 2(*a*) illustrates a binary signature waveform generated by a selected circuit module. The stream of pulses shown in FIG. 2(*b*) represents the sampling rate with respect to the signature waveform; to avoid ambiguities, this sampling rate should be synchronous with the highest pulse rate in the signature waveform FIG. 2(*a*), as shown, and should be an integral divisor of the highest rate. The gating waveform of FIG. 2(*c*) illustrates the sampling interval, which of course is much shorter in this illustration than that used in actual application. The resulting series of binary sample values is shown in FIG. 2(*d*), each of the 5-bit groups, or cells, of sample values being denoted by a bracket below the respective 5 binary digits. Each cell thereby forms a 5-bit binary number which is used to represent the value, or weight, of that respective cell; these respective cell values are shown in decimal form in FIG. 2(*e*). Each decimal number in FIG. 2(*f*) represents the running modulo 32 summation of the cell values during the sampling interval up to an including the cell value under which it is placed, the last modulo 32 sum of the sampling interval being the remainder $R_s$, which is the analyzed class identifier for the signature waveform of FIG. 14(*a*). As this is the signature waveform for the selected module which represents proper operation of that module, the class identifier $R_s$ is also the class identifier $R_c$, which is stored for that module for subsequent comparison during a fault isolation test.

The first five pulses during the sampling interval form the binary number 01000, as the first, third, fourth and fifth pulses sample the signature waveform at its relatively negative, or O level, while the second pulse samples the signature at its relatively positive, or 1, level. By weighting these binary digits according to their position in the sampling sequence as 1, 2, 4, 8 or 16, we find that the value of the first cell, in decimal form, is 2. Of course the corresponding modulo 32 sum at this point is also 2. In like manner, the next five sample pulses produce the binary number 11000, which may be expressed as the decimal number 3. Hence, the modulo 32 sum at this point is 5. The third 5-bit group of samples produces the binary number 00011, which is the decimal number 24, and by adding 2, 3 and 24, we obtain the modulo 32 sum of 29. The fourth group of samples provides a cell value of 19, at which point the algebraic sum is 48; hence, by dividing by 32, we obtain a remainder of 16, which is the modulo 32 sum. The process is continued through to the last or seventh cell of the sampling interval, which has a value of 30. The algebraic sum of all the cell values during this interval is 79, and upon dividing by 32 we obtain a remainder of 15. Consequently, the class identifier, $R_s$, of the analyzed signature waveform is 15.

Figure 3:
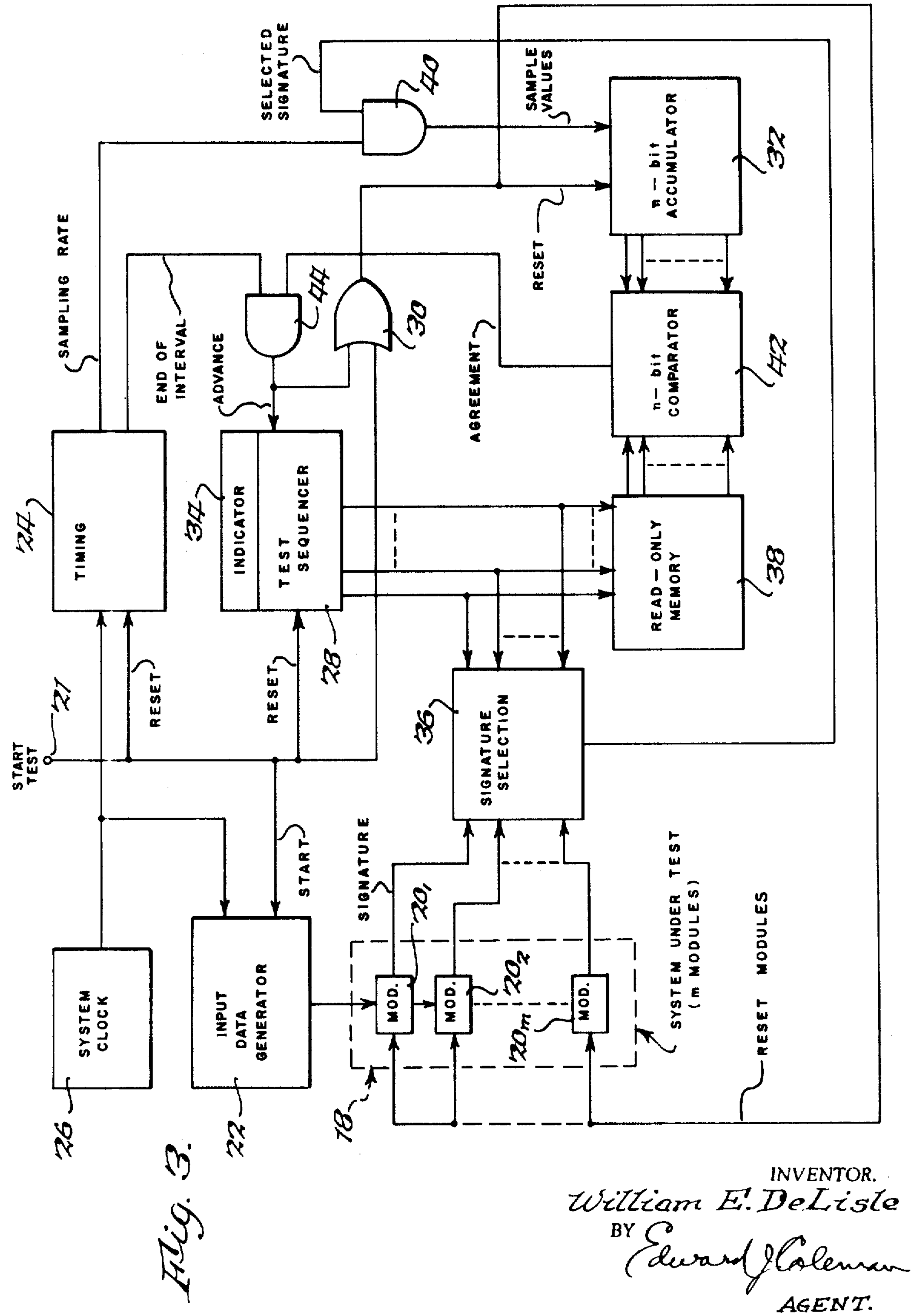
FIG. 3 is a functional block diagram of a fault isolation system according to the invention.

FIG. 3 is a block diagram of an automatic fault isolation system for sequentially testing a plurality of modules in accordance with the method described above. The system under test is represented by the dashed line block 18 and comprises a plurality of modules $20_l$ through $20_m$, which typically are interconnected in a variety of ways not shown in this simplified diagram. The test sequence is initiated by applying a "start test" signal via terminal 21 to activate an input data generator 22, which may be a separate unit or a binary pattern generator within the system under test. The activated data generator is operative to energize all of the modules $20_l$—$20_m$ and apply a predetermined input signal to system 18 which simulates normal operation of the modules under test. The "start test" signal is also coupled via OR gate 30 to initially reset all of the modules $20_l$—$20_m$. As previously discussed with respect to FIG. 1, this manner of circuit energization, together with initial reset of all memory elements, is operative to produce a suitable binary waveform at the signature output of each module. Timing circuitry 24, which is also energized and reset by the "start test" signal, generates the sampling rate, FIG. 2(*b*), and an end of interval signal for each module test which occurs at the trailing edge of the long pulse shown in FIG. 2(*c*). To provide a synchronous relationship with the signature generated by each module, these timing signals are derived from the system clock 26 used for driving input data generator 22.

The "start test" signal is also applied to reset all counters in a test sequencer 28 and, through an OR gate 30, to initially reset an $n$ -bit accumulator 32. The test sequencer 28 is advanced by one count at the completion of each successful module test. An unsuccessful test stops the test sequencer, and an associated indicator 34 displays the number of the failed module. The output lines from the test sequencer simultaneously control the signature selection logic 36 and a read-only memory 38. Circuit block 36 comprises appropriate gating circuitry for selectively connecting one of the module signature output lines to the load input of accumulator 32, which in this instance is represented by an AND gate 40, to which the stream of sample pulses from timing circuit 24 is applied as a second input. In this manner, the signature outputs of modules $20_1$—$20_m$ are selectively connected one at a time for test analysis according to a predetermined sequence. As previously discussed, this predetermined sequence, as controlled by the output lines of test sequencer 28, is designed so that no module will be tested until all modules providing inputs thereto have been tested.

The read-only memory 38 stores the predetermined signature waveform class identification number $R_c$ for each of the modules $20_1$—$20_m$ which represents proper operation of the module to which it corresponds. The memory is a truth table implementation adapted to read out, in the form of an $n$ -bit binary number, a selected one of the stored class identifiers $R_c$ in response to input signals from the test sequencer 28. The same output lines of the test sequencer control both signature selection 36 and read-only memory 38 so that the $n$ -bit binary number read out of memory 38 is the class identifier $R_c$ for the module from which a signature waveform is being obtained for analysis by selection circuit 36 at that same time.

The selected signature waveform is sampled by AND gate 40 at the rate established by timing circuit 24 to provide a series of sample values, such as those represented by FIG. 2(*d*), in the form of binary voltage levels to the input of the accumulator 32. The $n$-bit accumulator 32 is then operative to form and sum, modulo N, $n$-bit binary numbers from successive $n$-bit groups of input sample values. The contents of the accumulator at the end of every $n$ -bit group of input sample values is an $n$ -bit binary number which is the modulo N sum of the cell values at that instant in the sampling interval. The contents of the accumulator are continuously read out and compared with the number readout of memory 38 by means of an $n$ -bit digital comparator circuit 42. The output line of the comparator 42 is connected as one input to an AND gate 44, the second input of which is the "end of interval" signal line from the timing circuit 24. Consequently, at the end of the predetermined sampling interval for the selected module under test, AND gate 44 is enabled to pass the output signal from the comparator 42. The $n$ -bit binary number contained in accumulator 32 at the end of the sampling interval is the remainder of the modulo N summation during that interval and, thus, the class identifier $R_s$ corresponding to the signature waveform analyzed by the accumulator. Hence, at the moment AND gate 44 is enabled, the analyzed class identifier $R_s$ for a selected module is being compared with the stored class identifier $R_c$ for that module. If the two $n$ -bit binary numbers agree, the resulting agreement output signal of comparator 42 will be applied through AND gate 44 to advance the test sequencer 28 by one count, thereby selecting the next module to be tested and the corresponding stored class identifier $R_c$ to be read out. The agreement signal passed through gate 44 is also applied via OR gate 30 to reset the $n$ -bit accumulator to zero and to reset all memory elements in the modules $20_1$—$20_m$ for the start of the next sampling interval.

In the event that the N-bit outputs of accumulator 32 and memory 38 are in disagreement at the time of the "end of interval" signal, an advance signal will not be generated by gate 44. Consequently, the test sequencer will stop and indicator 34 will identify the faulty module.

Figure 4:
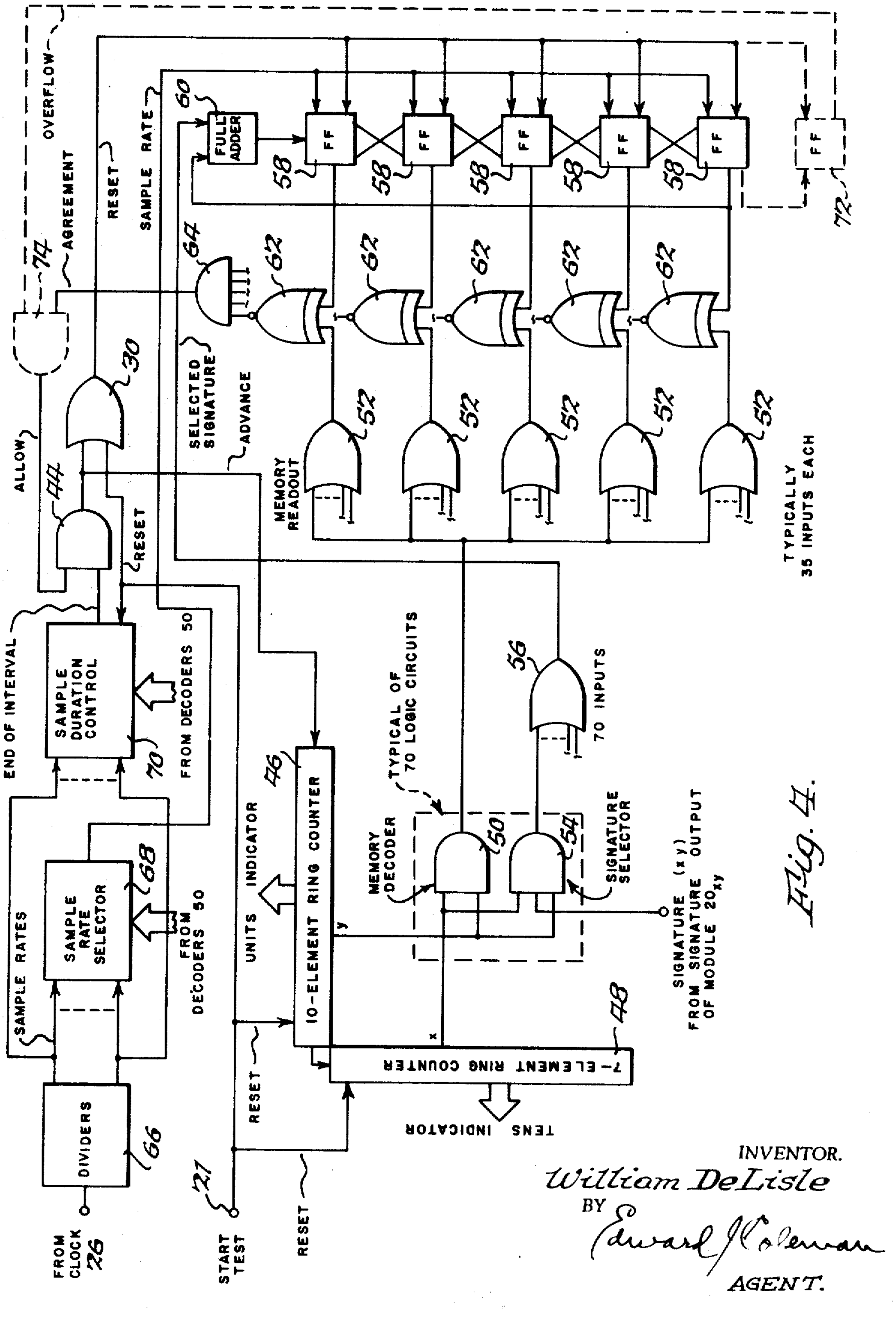
FIG. 4 is a logic diagram of an implementation of the FIG. 3 system.

A variety of implementations for the functional blocks of the fault isolation system illustrated in FIG. 3 are well known to those skilled in the art, one particularly suitable implementation being illustrated by the logic diagram of FIG. 4. For purposes of exemplification, the test sequencer, signature selection, and read-only memory are shown as embodied in a 10 ×7 ring counter array suitable for testing an electrical system comprising 70 modules. A 5-bit accumulator, comparator and memory readout are employed so that $n$ =5 and N=32 . As a consequence, the stored class identifiers $R_c$ and the analyzed class identifiers $R_s$ are in the form of 5-bit binary numbers. More specifically, test sequencer 28 comprises a 10-element ring counter 46, having outputs to a units indicator display, and a serially connected 7-element ring counter 48 having outputs to a tens indicator display, the tens and units displays comprising indicator 34.

Read-only memory 38 comprises a matrix of 70 decoder AND gates 50 and five readout OR gates 52. Each decoder AND gate has a tens digit input $x$ connected to the output terminal of one of the stages of ring counter 48 and a units digit input $y$ connected to the output terminal of one of the stages of ring counter 46. The output of each decoder 50 is connected to the inputs of selected ones of the decoder readout OR gates 52. Thus, although the output of the decoder illustrated in FIG. 4 is shown as connected to all five of the OR gates 52, another decoder may be connected to the first, third and fifth OR gates, while yet another decoder may be connected to the first, second and fifth OR gates, etc. Hence, each of the OR gates 52 typically has about 35 inputs. In order to read out a 5-bit binary number from the memory, therefore, the $x$ and $y$ outputs of the ring counters activate a selected one of the 70 decoders to generate an output voltage signal which will be read out of the selected OR gates 52 to which the decoder is connected. For example, say the stored class identifier for the 26th module to be sequentially tested is the binary number 11111. When the 1 in counter 48 is advanced to the second, or "2 digit," stage and the 1 in counter 46 is advanced to the sixth, or "6 digit" stage, the corresponding $x$ and 6 outputs will activate the decoder corresponding to the 26th module. The resulting 1 level output signal of the decoder will then be passed through all five OR gates 52 to read out the number 11111. Hence, it is the output connections from the decoder to the OR gates 52 that determine the stored class identifier corresponding to the module number represented by the ring counter inputs to that decoder.

Signature selection 36 comprises a matrix of 70 AND gates 54, each corresponding to one of the decoders 50, and a 70-input OR gate 56 for collecting all of the signature selector AND gate outputs into a single output line. Each signature selector gate has three inputs, one connected to an $x$ output of ring counter 48, another connected to the $y$ output of counter 46, and a third connected to the signature output of the module 20xy corresponding to the ring counter connections. For example, say that signature 26 from the 26th module in the testing sequence is to be selected for analysis. When the 1 in counter 48 is advanced to the second stage and the 1 in counter 46 is advanced to the sixth stage, the corresponding $x$ and $y$ outputs will enable the signature selector gate 54 having an input connected to the signature output of the 26th module. As a consequence, the signature (26th) generated by that module will be passed through AND gate 54 and OR gate 56 to the signature selection output line.

Accumulator 32, which performs the modulo 32 summation of cell values, consists of a 5-bit shift register and adder combination. The shift register is represented by the five flip-flop stages 58, having a full adder circuit 60 at the input of the first stage of the register. The two inputs to the full adder comprise a feedback connection from the last flip-flop stage of the register and a connection to the selected signature output of OR gate 56.

Comparator 42 comprises five inverted exclusive OR gates 62, each adapted to compare corresponding bit outputs of the shift register and memory, and an AND gate 64 having five inputs respectively connected to the output terminals of the exclusive OR gates.

Timing circuit 24, in this instance, comprises a set of dividers 66 for deriving a plurality of different sample rates from the clock 26 pulse stream, a sample rate selector 68, and a sample duration control 70. The capability of selecting from a variety of available sample rates is useful for a number of reasons. For example, in cases where it is desired to change the generator 22 input signal for the testing of certain modules, a change in sample rate may be required to maintain synchronous relationship with the highest pulse rate in the generated signature waveform. Further, by choosing a sample rate which is an integral divisor of the highest pulse rate in the signature waveform, and which contains a frequency factor not contained in the cycle rate, for the testing of high-speed digital systems, each bit position in the binary signature pattern is eventually sampled without the disadvantage of using high-speed logic elements throughout the fault isolation circuits.

Sample rate selector 68 comprises a plurality of gating circuits selectively controlled by the output lines from the decoders 50. That is, each selector gate is arranged to pass one of the sample rates upon being enabled by any one of a selected number of the memory decoders. Thus, for example, if the 26th module requires a 100 kHz. pulse rate for the sampling of its output signature waveform, the decoder AND gate 50 activated by the ring counter $xy$ outputs corresponding to the number 26 will enable a gate in the selector circuitry 68 to pass the 100 kHz. sample rate.

Sample duration control 70 employs a plurality of counters driven by the sample rates produced by dividers 66 and each controlled by output lines from selected ones of the decoders 50. As discussed hereinbefore, each one of the modules to be tested may have a different minimum test interval depending upon the nature of the functional circuits comprising the module. To keep the total test sequence time to a minimum, therefore, it is desirable to have a plurality of sampling, or test, intervals available to accommodate different modules, rather than having only a single sampling interval adapted to accommodate the module requiring the longest sampling duration. In this way, those modules which are completely exercised in a short period of time need not be tested for as long as the module requiring the longest test interval. Sample duration control 70 provides this selectable sampling interval capability as illustrated by the following example. Say the signature from module 26 is being selected for analysis, and that this signature requires a sampling interval of 100 milliseconds. In this event, the second stage of counter 48 and the sixth stage of counter 46 respectively produce $x$ and $y$ outputs which activate one of the memory decoders 50. The resulting output of the decoder is not only applied to the memory readout and sample rate selector gates, but it is also applied to enable the counter in sample duration control 70 which is adapted to produce a positive going signal while it is counting sample pulses and, at the end of an interval equal to 100 milliseconds, produce a negative-going transition as an output, such as the waveform shown in FIG. 2($c$).

To commence the automatic fault isolation test sequence, a "start test" signal is applied via terminal 21, such as for example by means of a start button or switch. This "start test" signal, in addition to energizing the fault isolation system, is connected to perform the following functions: start operation of the input data generator 22 (FIG. 3); reset the test sequencer ring counter 48 to zero so that the $x$ output represents the digit O; reset the units ring counter 46 so that a one is contained in its first stage, thereby providing a $y$ output representing the digit 1; reset to zero all the counters in sample duration control 70; and, via OR gate 30, reset all flip-flops 58 in the 5-bit accumulator shift register and reset all the modules $20_1$—$20_m$ (FIG. 3). In this manner, the $xy$outputs of the test sequencer ring counters are operative to activate the signature selector gate 54 connected to the signature output terminal of the first module to be tested. The $xy$ outputs also select the memory decoder gate 50 having output connections to OR gates 52 which correspond to the binary class identification number predetermined for the first module to be tested. For example, assume that it has been determined by design considerations that proper operation of the first module is indicated by a signature waveform such as that shown in FIG. 2($a$) for a test interval of 35 bits, and therefore having a modulo 32 summation of cells value of 15, as shown in FIG. 2($f$). That is 15, or the corresponding binary number 11110, is the class identifier $R_c$ to be stored for the first module in memory 38. In this event, the output line for the decoder 50 corresponding to the first module is connected to only the first, second, third and fourth OR gates 52, whereby the binary number read out from the memory and applied to one input of each of the inverted exclusive OR gates 62 is 11110.

Simultaneously, the FIG. 2($a$) signature waveform is passed through the enabled selector gate 54 and OR gate 56 to one input of the full adder 60. In the meantime, the sample rate FIG. 2($b$) from the set of dividers 66 which is synchronous with the highest pulse rate in signature waveform FIG. 2($a$) is passed by the gate in sample rate selector 68 which is enabled by the activated memory decoder 50 output. The same decoder output signal also enables the count-of-35 counter in the sample duration control 70. Consequently, the selected sample rate, in the form of a stream of pulses, is applied to drive the five flip-flops 58 of the accumulator shift register, thereby functioning as AND gate 40 (FIG. 3) to sample the selected signature loaded into the shift register. Resulting sample values loaded into the shift register are illustrated in FIG. 2($d$). Thus, after the first five sample pulses, the five flip-flop stages of the accumulator shift register contain the binary number 01000. As the next five sample values 11000 are loaded into the shift register; the first five sample values are shifted out of the last flip-flop stage of the shift register and fed back to the full adder 60 to be combined with the load input. As a result, full adder 60 is operative to perform binary addition of the numbers 01000 and 11000, whereby the resulting contents of the shift register upon being loaded with the tenth sample value is the modulo 32 sum 10100, or the decimal number 5. This process continues as illustrated by FIGS. 2($d$), (e) and (f) until at the end of the 35-bit sampling interval the addition of last group of five sample values 01111, or 30, to the previous sum of cell values 10001, or 17, provides a final modulo 32 sum of 11110, or 15. That is, 15 is the analyzed class identifier $R_s$ for the signature waveform of FIG. 2(a), and the corresponding binary number 11110 is contained in the accumulator shift register at the end of the sampling interval.

When the selected counter in sample duration control 70 counts up to 35 sample pulses, it stops and produces a negative transition signal which is applied to one input of AND gate 44. At this same time, the binary number being read out of the accumulator flip-flops, namely 11110, and applied to one input of each of the inverted exclusive OR gates 62 is the same as the binary number being read out of the memory OR gates 52. As a consequence, all five inverted exclusive OR gates 62 provide enabling inputs to AND gate 64, thereby producing an agreement signal which is connected to the second input of AND gate 44. The resulting output signal from AND gate 44 is applied to advance ring counter 46 by one count and, via OR gate 30, to reset all of the accumulator flip-flops 58 to zero and to reset the memory elements of modules $20_1-20_m$ (FIG. 3).

As a result of the advance signal, the test sequencer ring counters immediately proceed to select the decoder gate 50 and signature selector gate 54 corresponding to the second module to be tested. Now say the predetermined class identifier $R_c$ for the second module is the binary number 10001, in which event the decoder output will be connected to only the first and fifth OR gates 52. The test then proceeds in the same general manner as described for the first module. The activated memory decoder 50 enables the appropriate sample rate selecter gate and sample duration control counter, and the signature selected from the second module via gate 54 is applied to full adder 60 and sampled to load the accumulator shift register as before. In this instance, however, suppose that the contents of the accumulator at the end of the sampling interval is 11001. In this event the second inverted exclusive OR gate 62 will not detect agreement between the second flip-flop stage 58 and the second memory readout gate 52. Hence, when the end of interval signal is applied to one input of AND gate 44, there will be no agreement signal to enable advance and reset output signals from that gate. As a consequence, the test sequencer will stop and the units indicator will display the digit 2, indicating that the second module is faulty. The second module may then be replaced or repaired and the test sequence continued until another faulty module is detected in the same manner or until the last module is tested.

There are 31 usable signatures in this implementation; the signature belonging to the all 1 state of the signature waveform is not in practice assignable to any module since a complete failure (e.g., a short circuit) could produce a corresponding $R_s$ value. The signature class identifier belonging to the all O state may be used, however, by requiring the total cell weight to be greater than 0. That is, in order for an $R_c=0$, the algebraic sum of the cell values must be 32 or a nonzero multiple of 32, thereby leaving a modulo 32 sum or remainder of 0. This may be implemented by providing accumulator overflow detection circuitry as illustrated by the dashed line circuits in FIG. 4. More specifically, an additional flip-flop 72 is provided which is operative to be reset by the output of OR gate 30 and set by the shifting of a 1 out of the last flip-flop stage 58. The output of flip-flop 72 is connected to one input of an AND gate 74, the second input of which is connected to the output terminal of comparator AND gate 64. Hence, when the accumulator overflows, i.e., a 1 is shifted out of the last stage of the 5-bit shift register, flip-flop 72 is set and the resulting overflow indication signal is applied to enable AND gate 74 to pass any agreement signal from the 5-bit comparator, thereby allowing AND gate 44 to pass an end of interval signal. Thus, for a module having a predetermined memory readout of all 0's, if at the end of the test interval the accumulator contains all 0's and there is no overflow signal, thereby probably indicating a completely failed module, AND gate 74 will not allow the resulting agreement signal to enable AND gate 44. As a result, the test sequencer will stop, and the faulty module will be isolated. On the other hand, if the same module is operating properly, the valid signature when sampled and loaded into the accumulator shift register will be summed up to cause an overflow which will subsequently enable AND gate 74, upon generation of an agreement signal, to allow the test sequence to be continued.

It is apparent from the foregoing, that by employing signature waveforms and dividing digital signals into classes by taking weighted samples, summing them modulo N and using the remainder as a class identifier, a simplified and versatile fault isolation system is provided, with minimized storage requirements. Fault isolation is not 100 percent effective, however the system maximizes cost effectiveness and has exhibited a reliability of over 96 percent.

Although there have been described what are now considered to be preferred embodiments of the invention, modifications falling within the scope and spirit of the invention will occur to those skilled in the art. For example, the values of $n$ and N are chosen for design convenience according to a particular application, and any number of cells may be employed in the test process, with the sampling interval not necessarily comprising an integral number of calls. The functional circuitry described can be implemented with a variety of standard logic circuits. Memory 38 may comprise a medium scale integrated bipolar read-only memory, MOS memories, cores, thin film, etc. The technique is applicable to both built-in or external fault isolation for digital equipments. It will be further noted that the system can also be made applicable to isolate faults in some types of analogue or hybrid systems by including an analogue to digital converter and an analogue multiplexer in place of the signature selection circuit 36.

I claim:

1. A method for isolating faults in an electrical system having a plurality of interconnected circuits comprising the steps of: partitioning of waveforms into a selected number of classes each having an identifier; determining the identifier of a signature waveform for each of said circuits, which waveform represents proper operation of that circuit; storing the predetermined signature waveform class identifier for each of said circuits; energizing each of said circuits to generate a signature waveform; analyzing the signature waveform generated by each of said circuits to determine the class identifier corresponding thereto; and comparing the analyzed class identifier for each circuit with the stored class identifier for that circuit, a disagreement therebetween indicating a faulty circuit.

2. The method of claim 1 wherein said waveforms are binary waveforms, and said partitioning of the waveforms comprises the steps of: summing, modulo N, selected characteristic occurrences of said binary waveforms during a predetermined interval, where N is a predetermined positive integer; and using the remainder as said class identifier.

3. The method of claim 2 wherein said analyzing of the signature waveform generated by each of said circuits comprises the steps of: sampling said signature waveform at a predetermined rate to provide a series of binary sample values; forming $n$-bit binary numbers from successive $n$-bit groups of said sample values, each of said $n$-bit binary numbers representing the value of a respective $n$-bit group of samples; and summing, modulo N, the values of all $n$-bit groups of samples provided during said predetermined interval.

4. A fault isolation system for electrical equipment having a plurality of interconnected circuits comprising, in combination, means for storing a predetermined signature waveform class identifier for each of said circuits, means for obtaining a signature waveform from each of said circuits, means for analyzing the signature waveform obtained from each of said circuits to determine the class identifier corresponding thereto, and means for comparing the analyzed class identifier for each circuit with the stored class identifier for that circuit, a disagreement therebetween indicating a faulty circuit.

5. A fault isolation system in accordance with claim 4 wherein said means for analyzing the signature waveform obtained from each of said circuits comprises, means for sampling said signature waveform, and means for summing, modulo N, the output of said sampling means during a predetermined interval, where N is a predetermined positive integer, and where the remainder of said modulo N summation is the class identifier corresponding to said analyzed signature waveform.

6. A fault isolation system in accordance with claim 4 wherein: said stored waveform class identifier is an $n$ binary number; each of said signatures is a binary waveform; and said means for analyzing the signature waveform obtained from each of said circuits comprises, means for sampling said signature waveform at a predetermined rate to provide a series of binary sample values, and means for forming and summing, modulo N, $n$ binary numbers from successive $n$ groups of said sample values during a predetermined interval, where N is a predetermined positive integer, and where the remainder of said modulo N summation, in the form of an $n$ binary number, is the class identifier corresponding to said analyzed signature waveform.

7. A fault isolation system in accordance with claim 6 wherein said class identifier storage means comprises a memory from which any one of a plurality of $n$ binary numbers may be selectively read out.

8. A fault isolation system in accordance with claim 7 wherein said means for forming and summing $n$ binary numbers comprises an $n$ accumulator, and said means for obtaining a signature waveform includes means for selectively connecting a signature waveform output of each of said circuits to the load input of said accumulator in a predetermined sequence.

9. A fault isolation system in accordance with claim 8 wherein said accumulator includes an $n$-bit shift register, and said sampling means comprises means for applying a stream of pulses at said predetermined rate to drive said shift register.

10. A fault isolation system in accordance with claim 9 further including means for selectively reading out from said memory an $n$-bit binary number which is the class identifier for the circuit from which a signature waveform is being obtained for analysis, said selective readout being substantially synchronous with said means for selectively connecting signature waveforms to said accumulator, and wherein said means for obtaining a signature further includes means for energizing each of said circuits to generate a signature waveform.